(12) United States Patent
Mahnad et al.

(10) Patent No.: US 7,116,514 B2
(45) Date of Patent: Oct. 3, 2006

(54) METHODS AND SYSTEMS FOR MAGNETIC RECORDING

(75) Inventors: Faramarz Mahnad, Waltham, MA (US); George A. Saliba, Northborough, MA (US); Leo Cappabianca, Worcester, MA (US); Mitchell R. Steinberg, Upton, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/928,229

(22) Filed: Aug. 27, 2004

(65) Prior Publication Data

US 2005/0083600 A1     Apr. 21, 2005

Related U.S. Application Data

(60) Provisional application No. 60/513,180, filed on Oct. 20, 2003.

(51) Int. Cl.
*G11B 5/584* (2006.01)
(52) U.S. Cl. .................................. 360/77.12
(58) Field of Classification Search ............... None
See application file for complete search history.

(56) References Cited

U.S. PATENT DOCUMENTS

| | | | |
|---|---|---|---|
| 2,937,239 A | 5/1960 | Walker et al. | |
| 3,633,038 A | 1/1972 | Falk | |
| 3,829,895 A | 8/1974 | Tanaka et al. | |
| 3,919,697 A | 11/1975 | Walker | |
| 3,971,002 A | 7/1976 | Bricot et al. | |
| 4,056,830 A | 11/1977 | Smith | |
| 4,110,799 A | 8/1978 | Bergmans et al. | |
| 4,149,204 A | 4/1979 | Marino et al. | |
| 4,176,381 A | 11/1979 | de Niet et al. | |
| 4,321,634 A | 3/1982 | Lehureau | |
| 4,334,252 A | 6/1982 | Toriu | |
| 4,392,163 A | 7/1983 | Rijckaert et al. | |
| 4,414,589 A * | 11/1983 | Oliver et al. | 360/77.07 |
| 4,422,112 A | 12/1983 | Tanaka | |
| 4,424,541 A | 1/1984 | Koinuma et al. | |
| 4,439,793 A | 3/1984 | Nater | |

(Continued)

FOREIGN PATENT DOCUMENTS

EP     0 854 471 A1     7/1998

(Continued)

OTHER PUBLICATIONS

European Search Report mailed on Feb. 4, 2005 for EP patent application No. 04256410.4, 4 pages.

*Primary Examiner*—Hoa T. Nguyen
*Assistant Examiner*—Mitchell Slavitt
(74) *Attorney, Agent, or Firm*—Morrison & Foerster LLP

(57) ABSTRACT

According to one aspect, methods and systems for determining the position of a recording head using existing data structures on magnetic storage media are provided. In one example, a recording head writes data to an active track on a magnetic storage tape, the recording head including a write element and a read element in a known spatial relationship, wherein the read element is configured to access at least a portion of a reference track when the write element is accessing the active track. A controller determines a relative position of the transducer element to the reference track and repositions the recording head to write data to the active track. The read element may be a backward channel reader or dedicated read element of the recording head for reading reference tracks during read and/or write operations.

27 Claims, 12 Drawing Sheets

U.S. PATENT DOCUMENTS

| | | |
|---|---|---|
| 4,449,082 A | 5/1984 | Webster |
| 4,472,750 A | 9/1984 | Klumpp et al. |
| 4,479,156 A | 10/1984 | Kumagai et al. |
| 4,502,082 A | 2/1985 | Ragle et al. |
| 4,539,615 A | 9/1985 | Arai et al. |
| 4,679,104 A | 7/1987 | Dahlerud |
| 4,685,005 A | 8/1987 | Fields, Jr. |
| 4,802,030 A | 1/1989 | Henry et al. |
| 4,816,939 A | 3/1989 | Ford et al. |
| 4,866,548 A | 9/1989 | Rudi |
| 4,975,791 A | 12/1990 | Eggebeen |
| 4,979,051 A | 12/1990 | Eggebeen |
| 5,050,017 A | 9/1991 | Carr et al. |
| 5,055,959 A | 10/1991 | Saliba |
| 5,072,319 A | 12/1991 | Kohri et al. |
| 5,121,270 A | 6/1992 | Alcudia et al. |
| 5,126,895 A | 6/1992 | Yasuda et al. |
| 5,132,861 A | 7/1992 | Behr et al. |
| 5,257,148 A | 10/1993 | Solhjell et al. |
| 5,262,908 A | 11/1993 | Iwamatsu et al. |
| 5,285,331 A | 2/1994 | White |
| 5,289,328 A | 2/1994 | Saliba |
| 5,294,791 A | 3/1994 | Pahr |
| 5,294,803 A | 3/1994 | Pahr |
| 5,371,638 A | 12/1994 | Saliba |
| 5,426,551 A | 6/1995 | Saliba |
| 5,448,430 A | 9/1995 | Bailey et al. |
| 5,452,152 A | 9/1995 | Rudi |
| 5,488,519 A | 1/1996 | Ishida et al. |
| 5,523,904 A | 6/1996 | Saliba |
| 5,563,868 A | 10/1996 | Farnsworth et al. |
| 5,588,007 A | 12/1996 | Ma |
| 5,600,500 A | 2/1997 | Madsen et al. |
| 5,600,505 A | 2/1997 | Ayres |
| 5,617,269 A | 4/1997 | Gordenker et al. |
| 5,757,575 A | 5/1998 | Hallamasek et al. |
| 5,796,537 A | 8/1998 | Goker et al. |
| 5,815,337 A | 9/1998 | Milo |
| 5,844,814 A | 12/1998 | Chliwnyj et al. |
| 5,847,892 A | 12/1998 | Goker |
| 5,862,014 A | 1/1999 | Nute |
| 5,940,238 A | 8/1999 | Nayak et al. |
| 5,949,604 A | 9/1999 | Saliba |
| 5,973,872 A | 10/1999 | Saliba |
| 5,973,874 A | 10/1999 | Panish et al. |
| 5,978,188 A | 11/1999 | Kaaden et al. |
| 5,982,711 A | 11/1999 | Knowles et al. |
| 6,005,737 A | 12/1999 | Connolly et al. |
| 6,018,434 A | 1/2000 | Saliba |
| 6,061,199 A | 5/2000 | Goker et al. |
| 6,075,678 A | 6/2000 | Saliba |
| 6,084,740 A | 7/2000 | Leonhardt et al. |
| 6,088,184 A | 7/2000 | Hu |
| 6,108,159 A * | 8/2000 | Nute et al. ................ 360/77.12 |
| 6,118,605 A | 9/2000 | Call et al. |
| 6,128,155 A | 10/2000 | Sugawara et al. |
| 6,130,792 A | 10/2000 | Goker |
| 6,134,072 A | 10/2000 | Zweighaft |
| 6,141,174 A | 10/2000 | Judge et al. |
| 6,185,063 B1 * | 2/2001 | Cameron ................ 360/78.04 |
| 6,188,532 B1 | 2/2001 | Albrecht et al. |
| 6,222,698 B1 | 4/2001 | Barndt et al. |
| 6,236,529 B1 | 5/2001 | Leonhardt et al. |
| 6,246,535 B1 | 6/2001 | Saliba et al. |
| 6,275,349 B1 | 8/2001 | Smith |
| 6,275,350 B1 | 8/2001 | Barndt |
| 6,285,519 B1 | 9/2001 | Goker |
| 6,307,718 B1 | 10/2001 | Kasetty |
| 6,331,920 B1 | 12/2001 | Albrecht et al. |
| 6,339,522 B1 | 1/2002 | Hoelsaeter |
| 6,366,422 B1 | 4/2002 | Daniel et al. |
| 6,433,951 B1 | 8/2002 | Lubratt |
| 6,493,174 B1 | 12/2002 | Stubbs |
| 6,512,651 B1 | 1/2003 | Eifert et al. |
| 6,545,837 B1 | 4/2003 | Tran |
| 6,570,731 B1 | 5/2003 | Burke et al. |
| 6,700,729 B1 | 3/2004 | Beck et al. |
| 6,768,608 B1 | 7/2004 | Saliba et al. |
| 6,775,092 B1 | 8/2004 | Zweighaft et al. |
| 6,801,383 B1 | 10/2004 | Zweighaft et al. |
| 6,839,196 B1 | 1/2005 | Trivedi |
| 2002/0021524 A1 | 2/2002 | Saliba et al. |
| 2002/0176200 A1 | 11/2002 | Trivedi |
| 2003/0043498 A1 | 3/2003 | Johnson et al. |
| 2004/0042115 A1 | 3/2004 | Saliba et al. |
| 2005/0083601 A1 | 4/2005 | Mahnad et al. |
| 2005/0083602 A1 | 4/2005 | Saliba et al. |
| 2005/0088770 A1 | 4/2005 | Saliba et al. |
| 2005/0088776 A1 | 4/2005 | Saliba et al. |
| 2005/0094308 A1 | 5/2005 | Mahnad et lal. |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

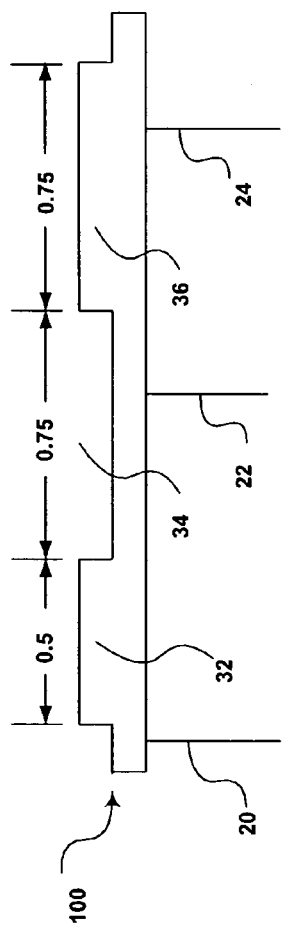
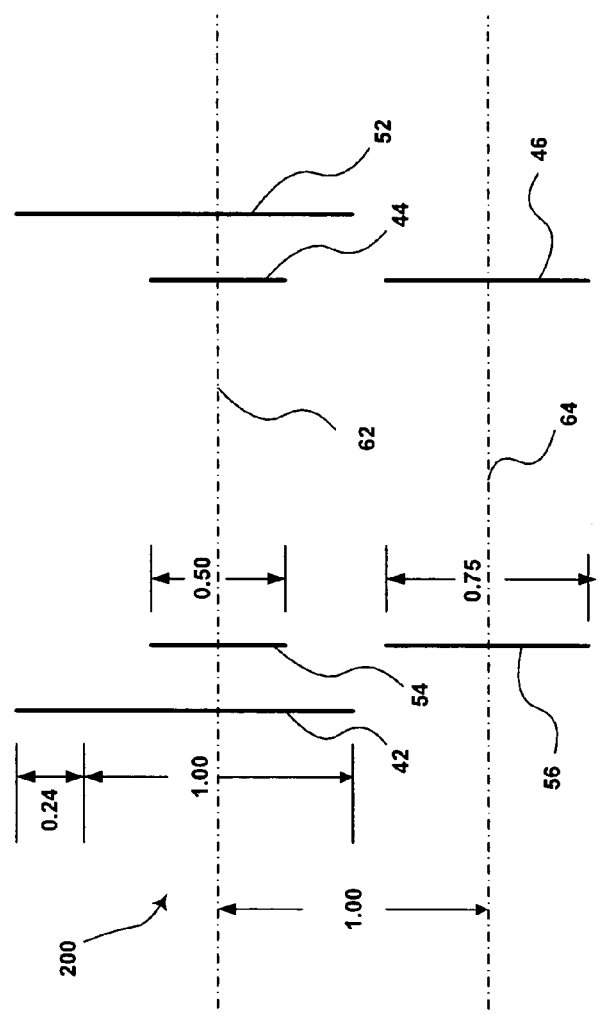

Figure 6 (Conventional format)

| Physical | Logical |
|---|---|
| 14 | 13 |
| 13 | 11 |
| 12 | 9 |
| 11 | 7 |
| 10 | 5 |
| 9 | 3 |
| 8 | 1 |
| 7 | 12 |
| 6 | 10 |
| 5 | 8 |
| 4 | 6 |
| 3 | 4 |
| 2 | 2 |
| 1 | 0 |

Figure 7

| Physical | Logical |
|---|---|
| 14 | 13 |
| 13 | 11 |
| 12 | 9 |
| 11 | 7 |
| 10 | 5 |
| 9 | 3 |
| 8 | 1 |
| 7 | 12 |
| 6 | 10 |
| 5 | 8 |
| 4 | 6 |
| 3 | 4 |
| 2 | 2 |
| 1 | 0 |

METHODS AND SYSTEMS FOR MAGNETIC RECORDING

CROSS REFERENCE TO RELATED APPLICATION

The present application claims benefit of earlier filed provisional patent application, U.S. Application No. 60/513,180, filed on Oct. 20, 2003, and entitled "SERVO METHODS AND SYSTEMS FOR MAGNETIC RECORDING AND READING," which is hereby incorporated by reference as if fully set forth herein.

BACKGROUND

1. Field of the Invention

The invention and its various aspects relate generally to magnetic tape storage devices and systems, and more particularly to methods and systems for head positioning servo systems for detecting misalignment between a read and/or write head and one or more data tracks.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and data tracks can cause data errors during read back and data loss on adjacent tracks during writing.

What is desired are methods and systems for more accurately recording data tracks on a storage medium with increased density and read back accuracy. Additionally, positioning read and/or write heads with respect to data tracks of a magnetic storage tape in a tape drive, and doing so with increased accuracy and reduced cost and complexity is desired.

BRIEF SUMMARY

In one aspect of the present invention methods and systems are provided for writing data tracks utilizing data from previous tracks to provide positional information to servo the head.

In one example, a recording head writes data to an active track on a magnetic storage tape, the recording head including a write element and a read element in a known spatial relationship, wherein the read element is configured to access at least a portion of a reference track when the write element is accessing the active track. A controller determines a relative position of the transducer element to the reference track in response to a signal from the read element and repositions the recording head to write data to the active track. The read element includes, for example, a backward channel reader or dedicated read element of the recording head for reading reference tracks during read and/or write operations.

In another example, a method for recording data tracks on a magnetic storage medium is provided. The method includes recording a first and second data track on the storage medium, the second data track partially overlapping the first data track, and generating a read signal from a read element associated with a transducer head while recording the second data track, the read signal associated with the first data track. The relative position of the second data track to the first data track is determined from the read signal and a controller may adjust the position of a write element recording the second data track.

In another aspect, a variable track format includes multiple tracks formed along a magnetic storage tape. The width of the tracks varies within a band with at least one track being of full width, the full width track being generally larger than other track widths.

According to another aspect of the present invention, various transducer heads are provided, e.g., to perform various methods described herein. In one example, a transducer head adapted for use with a head positioning servo system is described. The head may include a data transducer for writing to or reading from a selected data track and a reference transducer to provide servo information. The data transducer and the reference transducer are mounted or fixed in a predetermined spatial relationship configured such that alignment of the reference transducer with at least a portion of a reference track results in the data transducer being positioned over a desired region of a magnetic storage tape to at least one of read and write data. For instance, the reference transducer may be positioned at a center of a reference track with the data transducer spaced a desired distance from the reference track to write multiple tracks of a desired width. A controller may adjust the data transducer based on signals from the reference transducer indicating relative position information.

The transducer head may be center tapped with two effective read elements. The read elements may be configured to align with a center, edge, or the like of one or more reference tracks and a track being written to. Additional examples may include three or more read elements aligned in various manners.

The servo systems and methods described herein may be employed in a tape drive to servo a recording head with respect to a recording tape. A suitable controller may determine the relative position of the head to the tape, thereby allowing the controller to adjust the head position to achieve a desired position with respect to the tape.

Additionally, the servo systems and methods described herein may be employed with various other servo methods known in the art. For example, magnetic, optical, open loop, and the like.

Various aspects and examples of the present inventions are better understood upon consideration of the detailed description below in conjunction with the accompanying drawings and claims.

BRIEF DESCRIPTION OF DRAWINGS

FIG. 1 illustrates an exemplary head assembly;

FIG. 2 illustrates one channel of an exemplary head assembly including forward and backward read-write elements and servo elements;

FIG. 6 illustrates an exemplary track width layout of a storage tape conventionally recorded with an SDLT tape drive;

FIG. 7 illustrates an exemplary variable track width layout of a storage tape recorded with an exemplary method described herein;

DETAILED DESCRIPTION

Figure 3:
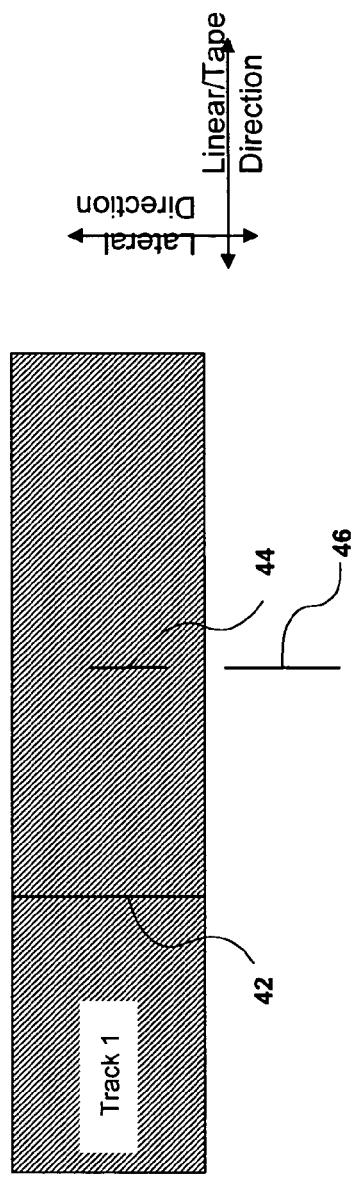
FIG. 3 illustrates an exemplary data track writing process.

Various methods and systems for sensing lateral tape motion and providing calibration and/or position information for a servo system, e.g., a primary servo or subsystem servo, are provided. The following description is presented to enable a person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head and data tracks in a tape drive during writing and reading processes is one of the main challenges in the area of magnetic storage tape systems. Exemplary methods and systems described below gather positional information for the positioning of data tracks by utilizing existing data structures on a magnetic storage tape in a relatively inexpensive manner. As a result, the need for magnetically recorded or optical servo information may be reduced or eliminated, and increased user data storage capacity, simplification of the servo positioning mechanism, and higher servo system bandwidth and data throughput may be achieved over previous servo techniques. For example, some of the exemplary methods and systems may be used without separate mechanical structures to mount an optical system or the like for detecting servo positioning information. Due to this decrease in mechanical structure, there is an increase in servo actuator response, enabling higher actuator band width and finer track width resolution.

Exemplary tape drive servo systems and methods that may be used with the various exemplary systems and methods described herein include, for example, those described in U.S. Pat. Nos. 6,246,535, 6,108,159, and 5,371, 638, and U.S. patent application Ser. No. 09/865,215, all of which are hereby incorporated by reference as if fully set forth herein. Those of ordinary skill in the art will recognize, however, that various other suitable tape drive systems and servo systems (perhaps with some modification that will be apparent to those of ordinary skill in the art) may be used with one or more of the exemplary systems and methods described.

In one exemplary aspect, an adaptive, variable track width format for magnetic recording methods and tape drive systems is provided. The exemplary methods and systems use servo positioning techniques that utilize data from previously recorded data tracks to provide location information during writing processes. In one example, a first data tracks is written with a write element having a width wider than is required for read back. The first data track written is used to servo the head and write element adjacent and partially overwriting the first data track. A second data track may be written parallel to and partially overwriting or trimming the first written data track to a reduced or minimum track width. For example, the trimmed track width is desirably wide enough to be successfully read by a drive system head, e.g., a 3 sigma drive LTM/Head. Each successively written data track may similarly be written while reading one or more previously written data tracks and partially overwriting the previously written data track.

More specifically, in one example, a first data track is written to a magnetic storage medium based on the ability of the drive system to maintain track position, e.g., through "open loop" control or other servo control methods, e.g., optical or magnetic servo systems, available to the drive system. Subsequent data tracks are referenced to the previously written data tracks by positioning a separate servo-read element to detect at least a portion of one or more of the previously written data tracks. In one example, after a first data track n-1 has been written on the storage tape, and while writing track n, a servo-read element in a fixed spatial relationship to a write element is positioned away from the center of track n, on at least a portion of track n-1. The servo read element may be positioned at the center, aligned with, or overlapping the edge of track n-1. The head may be repositioned while writing to data track n based on the relative position of the servo element to the previously written data track, n-1. Data track n may be recorded partially overlapping data track, n-1, thereby trimming the width of track n-1 to a desired width.

The servo read element may be aligned with different portions of the previously written track n-1. For example, the servo read element may be aligned with an edge of track n-1 that is farthest from the current track n such that if track n-1 can be successfully read, based on error rates, quality metrics, etc., then track n is correctly positioned with respect to track n-1, i.e., track n is overwriting track n-1 to a predetermined width. If track n-1 cannot be successfully read, then the head is repositioned to move track n farther from track n-1. During this procedure track n-1 is trimmed in width. This servo and trimming process continues, keeping the track width of track n-1 greater than or equal to a minimum readable track width. In one example, if track n-1 can be successfully read, the head is moved slightly closer to track n-1.

According to another example, after two data tracks n-1 and n-2 have been written, and while writing track n, a read head straddles the border between the previous tracks, n-1 and n-2. Samples of the signal amplitude are taken during the gaps between data blocks in tracks n-1 and n-2. The relative amplitudes of these signals from track n-1 and track n-2 are compared to determine relative positional information. For example, if the ratio of the signal amplitudes is 1, then the position of the current track that is being written, track n, is correct. If the ratio is not 1, then the head is repositioned in the appropriate direction. This process continues, attempting to keep the head in the proper position with respect to tracks n-1 and n-2.

FIG. 1 illustrates an exemplary data transducer head 100 including a data read element 32 and servo read element 36. Head 100 is a center tapped magneto-resistive variable track read head 100. In this example, head 100 includes a single magneto-resistive stripe with two read elements, data read element 32, and servo read element 36. The dimensions of element width and separation by recess 34 are normalized to a predetermined or minimum track width, Wm. It is noted that the optimal dimension for data read element 32, recess 34, and servo read element 36 depend, at least in part, on the particular application and method, where the given dimension shown here are for illustrative purposes only (other examples are shown in FIGS. 15–20). Additionally, taps 20, 22 and 24, are electrical taps to the stripe with taps 20 to 22 for the data read element 32 and taps 24 to 22 for the servo read element 36, with tap 22 the center-tap or common tap.

During an exemplary write operation of head 100, data read element 32 is aligned with an active track and read element 36 is aligned with an edge of a previously written data track, where data read element 32 is 0.50 Wm and servo read element 36 is 0.75 Wm, and the distance separating data read element 32 and servo read element 36 is 0.75 Wm. Monitoring servo read element 36 provides information regarding the relative position of head 100 relative to a reference data track. If a reference data track can be read the head may be moved slight away and if not successfully read moved towards the reference data track. The head may be continuously or intermittently adjusted based on signals from servo read element 36.

In other examples, servo read element 36 may be configured to align with the center of a reference track and head 100 adjusted based on signal quality metrics that vary as a function of track offset.

FIG. 2 illustrates exemplary forward and backward read-write elements and servo read elements for one channel of a read/write head 200. Those of ordinary skill in the art will recognize that there are typically multiple channels that comprise a tape drive head; however, for illustrative purposes only a single channel is shown. In this example, write elements 42 and 52 are 1.24 Wm, data read elements 54 and 44 are 0.50 Wm, and servo read elements 56 and 46 are 0.75 Wm. Forward write element 42, and forward data read element 44 are aligned about the desired or predetermined track width centerline 62. Backward write element 52, and backward data read element 54, are also aligned about the minimal track width centerline 62. The distance from the nominal track width centerline 62, to servo read elements 56 and 46 is 1.00 Wm, thereby placing servo read elements 56 and 46 on the previously written data track centerline 64 (after being trimmed).

FIG. 3 illustrates a first forward written data track using the forward elements of head 200. Write element 42 and read element 44 are disposed at nominal locations with track center and servo read element 46 is laterally displaced adjacent to read element 44. The first data track 1 is written to the servo/LTM capability of the tape drive, e.g., open loop or with drive servo systems. The lateral width of write element 42 and recorded track 1 in this instance are equal to the total of the minimum track width for read back and the maximum distribution of the LTM, e.g., six times the standard deviation, which is equal to 0.24 Wm in one example. Also, because data track 1 will be trimmed when the next track is written, the width of track 1 may be initially written larger than needed for successful read back.

Figure 4:
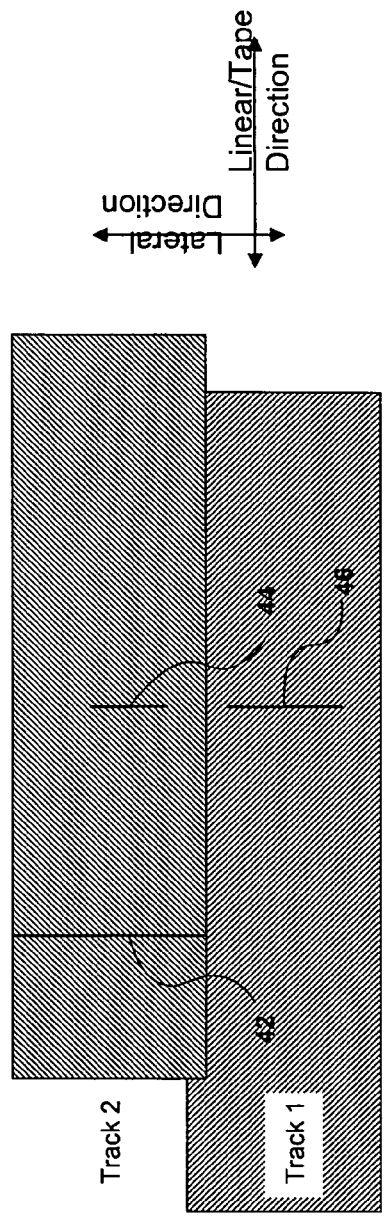
FIG. 4 illustrates an exemplary data track writing process where a previously written data track is partially overwritten.

FIG. 4 illustrates the second forward written data track, track 2, partially overlapping and trimming the width of track 1. The nominal orientation of writer element 42 and servo read element 46 to the previously written track 1 is shown. The drive system will position write element 42 based on servo signals from servo read element 46 such that the first written data track 1 is trimmed, i.e., track 1 is slightly overwritten to a reduced or narrowed width. More specifically, servo read element 46 is positioned at track center of track 1 to provide position information for the head and write element 42. The spatial relationship between servo read element 46 and write element 42 is such that by following track 1 with servo element 46, track 2 is written at a preset location relative to track 1. In one example, servo read element 46 is configured to read and position write element 42 such that the worst case minimal trimming if track 1 will still result in a track width that may be read back by the system. For example, the minimum width may be set based on the ability of a 3-sigma drive LTM/head or the like.

Conventionally, the operation of read element 46 is primarily to read the previously written data track for data integrity, a re-read of the data. In this example, however, servo read element 46 is designed larger than data read element 44 for increased sensitivity to off-track motion and narrow track-widths. In this configuration servo read element 46 is monitored for data recovery quality metrics. For example, when data integrity parametric(s) begin to decrease, indicating the servo read element 46 is drifting away from the reference data track, the head is repositioned until the data integrity parametric(s) return to acceptable levels. Data integrity parametrics may be derived from many measurements of the data waveform, such as signal amplitude, signal level, read enable state, phase lock loop (PLL) state, quality monitor count, noise amplitude, bit error rate, and the like. The servo read element 46 and servo system may constantly or intermittently monitor the reference track and data integrity signals such that when data integrity levels drop the head is repositioned to restore the data integrity levels. In this manner, the servo system may use a previously written data track to ensure a minimum trimmed track width, whose data has been validated.

Figure 5:
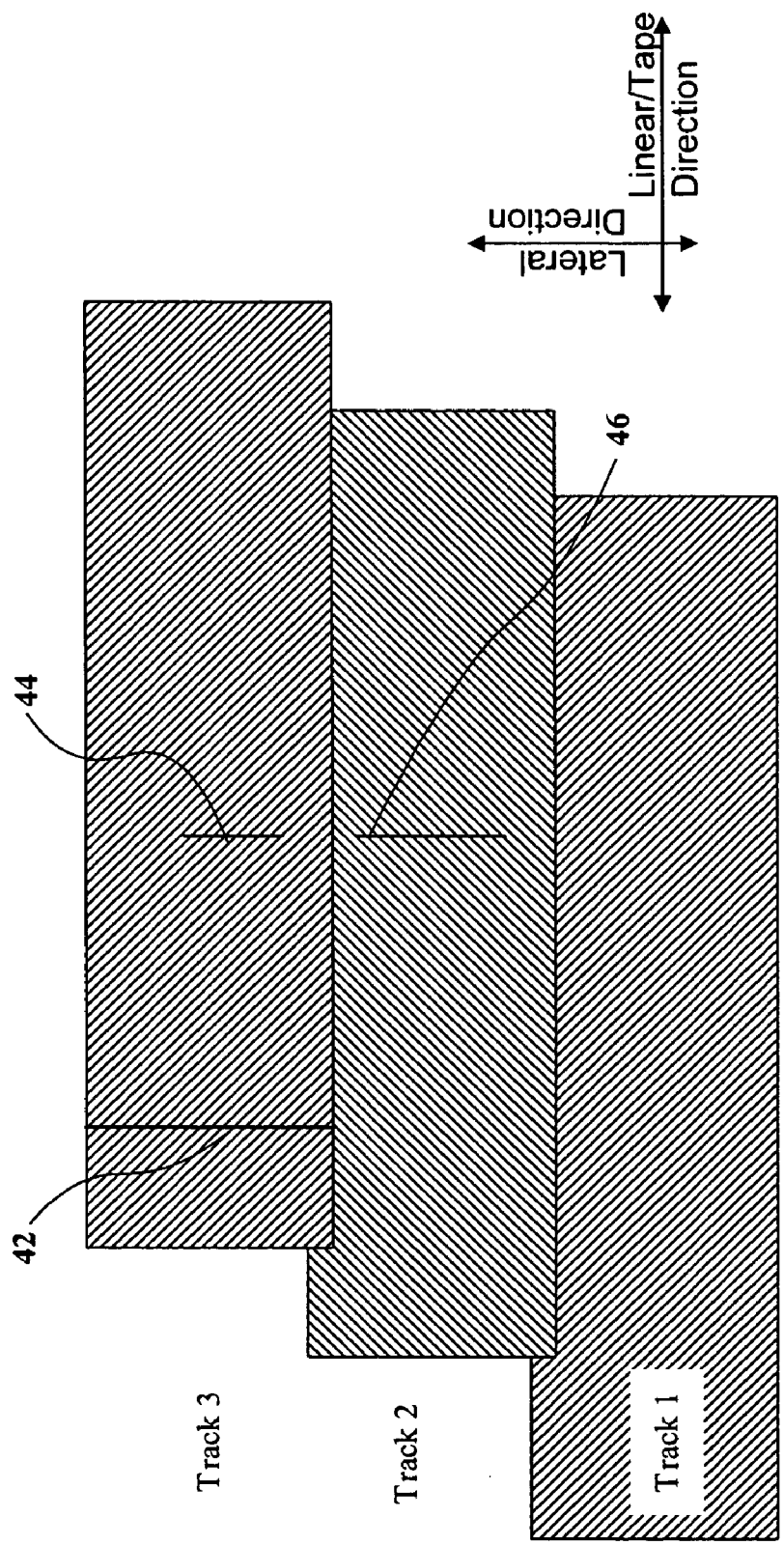
FIG. 5 illustrates an exemplary data track writing process where a previously written data track is partially overwritten.

FIG. 5 further illustrate the progression of writing data tracks. The third written forward data track, track 3, partially overwrites and trims track 2 similar to the trimming of track 1 by track 2. Additional tracks may be written with each iteration trimming the previously written data track leaving tracks of variable widths and a final data track the full width of write element 42.

FIG. 6 illustrates a band of data tracks having a uniform track width format recorded conventionally, e.g., by an SDLT storage tape drive system. As illustrated, physical tracks 1–14 are laid out laterally along a storage medium with a uniform width or pitch. The logical forward tracks are even (0, 2, 4, . . . ) and the logical backward tracks are odd (1, 3, 5, . . . ). In contrast, FIG. 7 illustrates a variable track width format produced as described herein. Physical tracks 1–6 and 8–13 (or logical track 0–11) may vary in width and are smaller in width than physical tracks 7 and 14 (or logical tracks 12 and 13). The last track of a direction group, e.g., logical tracks 12 and 13, will be the full width of the write element because these tacks are not trimmed by adjacent data tracks. Therefore, for a single band of 14 data tracks, forward track 12 and backward track 13 are the full width of the write element, and the remaining tracks are trimmed to a smaller and/or varying width.

According to another exemplary servo method for obtaining servo position information from an adjacent data track, read elements of a reverse direction channel are used while recording data tracks. In one aspect of this example, no additional elements, e.g., read elements, are needed compared to conventional multi-channel recording heads, such as a conventional SDLT recording head. One or more read elements of the reverse direction channels are used as a servo read element. In particular, the read elements of the reverse direction channels may be strategically placed to provide servo information from previously written data tracks.

In previous examples, a simple modification to the read and write head geometry will provide useful servo positioning information. In other examples, a more robust design utilizes multiple channels in concert to provide head position information that is more accurate and continuous than a single channel head design. The servo sampling technique may detect positioning information continuously or at specific time intervals, e.g., during gap times.

In this example, magnetic recording read elements that are generally not used during writing or reading operations are utilized to provide position information. During an active operation, e.g., a writing or reading operation, in the forward direction, the reverse read elements are generally not used. The normally unused read elements may be used to provide servo information for the active read/write elements from previously written data tracks. For example, the read element can provide positioning information by reading the gap of an adjacent track, or by the state of data signal qualifiers or parametrics near the track center or edge. An example of these qualifiers are the quality monitor count, the signal to noise ratio, the signal amplitude, the noise amplitude, the read gate signal, and the like.

Using one or a combination of these data signal qualifiers to determine the reader location with respect to a data track provides some level of accuracy about the reader position. The positioning information accuracy can be improved by using two readers located at the opposing edges of a given track. Both of the readers will provide a good data signal when they are positioned only at the track edges, within some tolerance, providing more accurate positioning information. More accuracy can also be achieved by placing multiple readers in consecutively spaced positions form the edges of the data track. In this way the states of the track qualifiers from each reader will provide more continuous positioning information.

Figure 8:
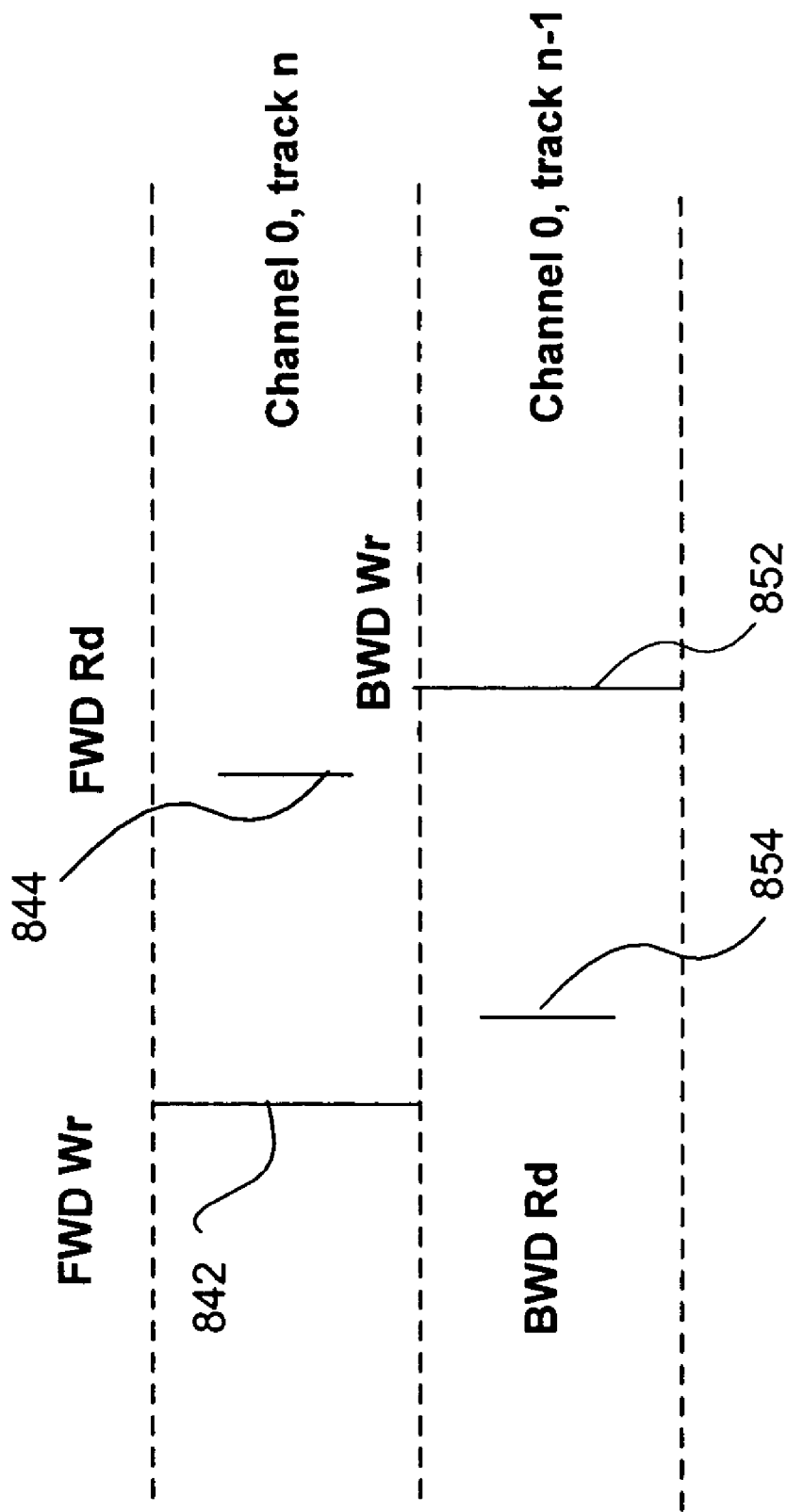
FIG. 8 illustrates an exemplary data track writing process using a backward reader element to servo the forward writing element.

FIG. 8 illustrates an exemplary method where a forward writer-reader pair 842, 844 are disposed one track width away from the backward writer-reader pair 852, 854. In one example, during a forward active operation (writing or reading) to track n, the operation is interrupted periodically to read positioning information from the backward reader 854 aligned with the adjacent track n-1. The head may be repositioned based on read signals derived from the adjacent track n-1 and the active operation continued.

Figure 9:
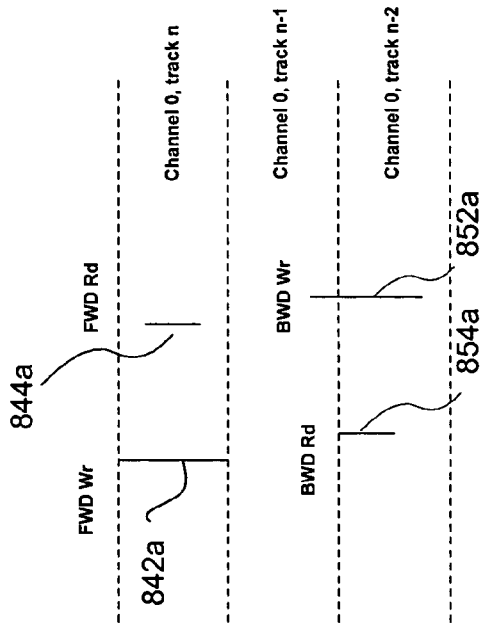
FIG. 9 illustrates an exemplary data track writing process using a backward reader element at an edge of a previously written data track to servo the forward writing element.
Figure 10:
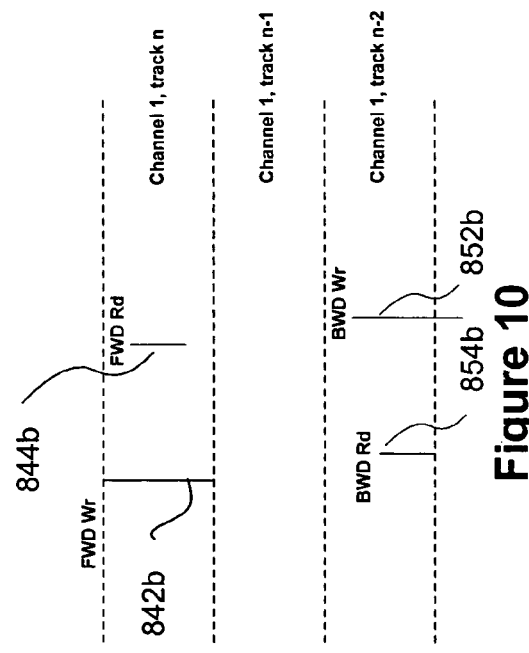
FIG. 10 illustrates an exemplary data track writing process using a backward reader element at an edge of a previously written data track to servo the forward writing element.

FIG. 9 illustrates a channel 0 writer-reader pair 844a, 844a geometry of a multi-channel head. In this example, the backward reader 854a is placed near the top edge of a previously written track n-2. FIG. 10 illustrates the writer-reader pair geometry of channel one of the same multi-channel head shown in FIG. 9. The backward reader 854b is positioned at the bottom edge of a previously written track of channel 1, track n-2. Using read signals and, for example, data qualifying information, from the backward reader 854a of channel 0, track n-1 and the backward reader 854b of channel 2, track n-2, a relative position of the head may be determined. For example, data qualifying information from each channel may be compared to predetermined values to monitor and adjust the position of the head. This exemplary configuration and method may be extended to include all channels of a multi-channel head. All even channels may include geometry at least similar to channel 0 and all odd channels may include geometry at least similar to channel 1.

Figure 11:
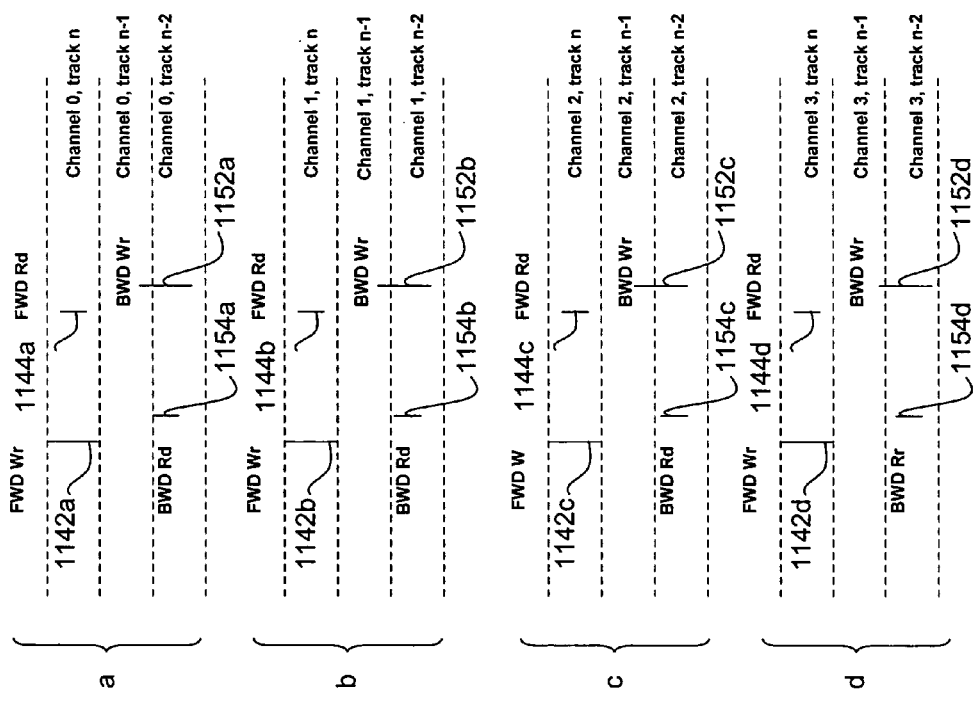
FIG. 11 illustrates an exemplary data track writing process using multiple backward reader elements gradually offset with previously written data tracks to servo the forward writing element(s)
Figure 12:
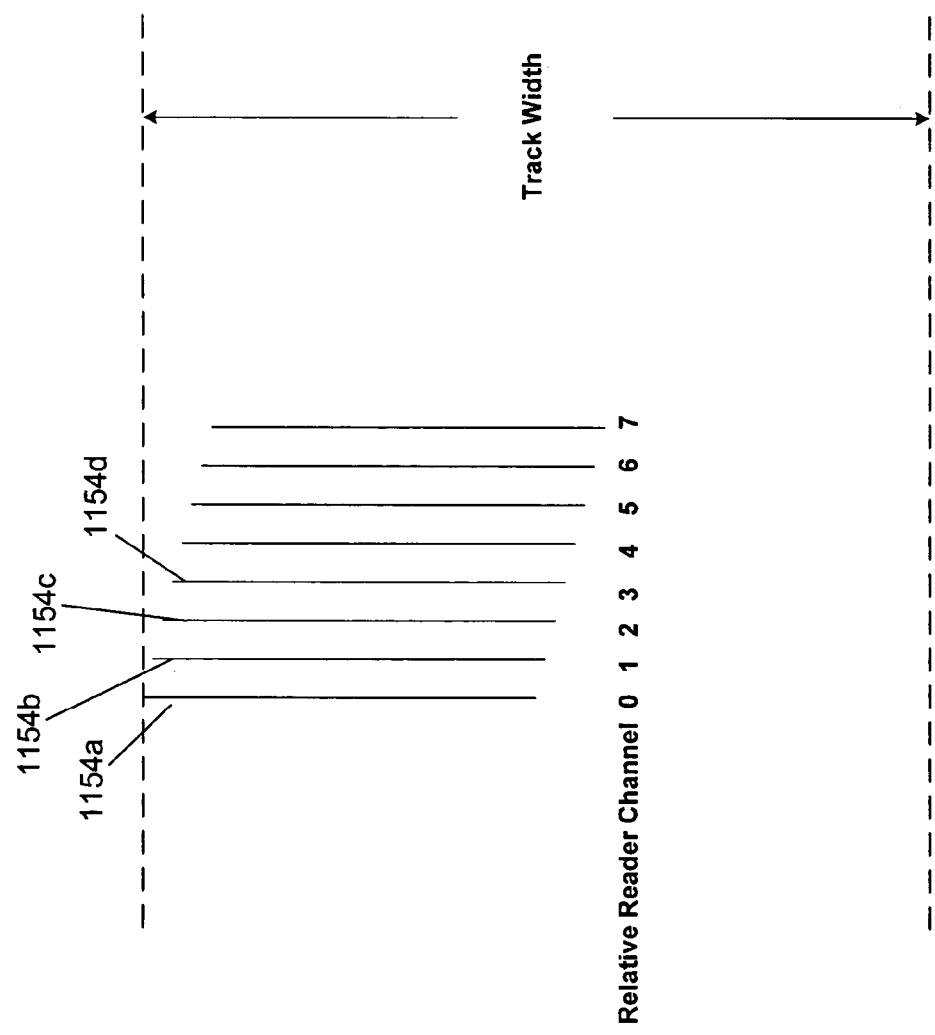
FIG. 12 illustrates relative read element positions about their respective data tracks for the example illustrated in FIG. 11.

FIG. 11 illustrates an exemplary head geometry of the first four channels (0 through 3) of a multi-channel head. In this example, the reverse channel read elements 1154a–d are gradually offset with respect to forward read elements 1144a–d, forward write elements 1142a–d, and adjacent data tracks n-2 to provide a more continuous indication of the head position. In particular, the backward read elements 1154a–d are gradually offset by small increments consecutively from each other as shown in FIG. 11. FIG. 12 more clearly illustrates the relative position of read elements 1154a–d about their respective data tracks.

In another example, four staggered read elements near the top edge of a track and four staggered read elements near the bottom edge of a track may be employed may a multi-channel head. It will be recognized by those of ordinary skill in the art that various other exemplary configurations of aligned or offset backward read elements may be used to provide position information to a servo system.

According to one exemplary method and system, a read/write head halts a read/write process at a predetermined time and a servo read element, e.g., a dedicated servo element or backward read element, is detect at least a portion of a reference data track. The system may register the location and/or boundaries (e.g., edges) of the reference data track relative to the active track and make adjustments to the position of the active track based on predetermined values or signals from the read head. The process of halting and checking the location of a reference data track may be periodically repeated as desired during writing a data track.

Figure 13:
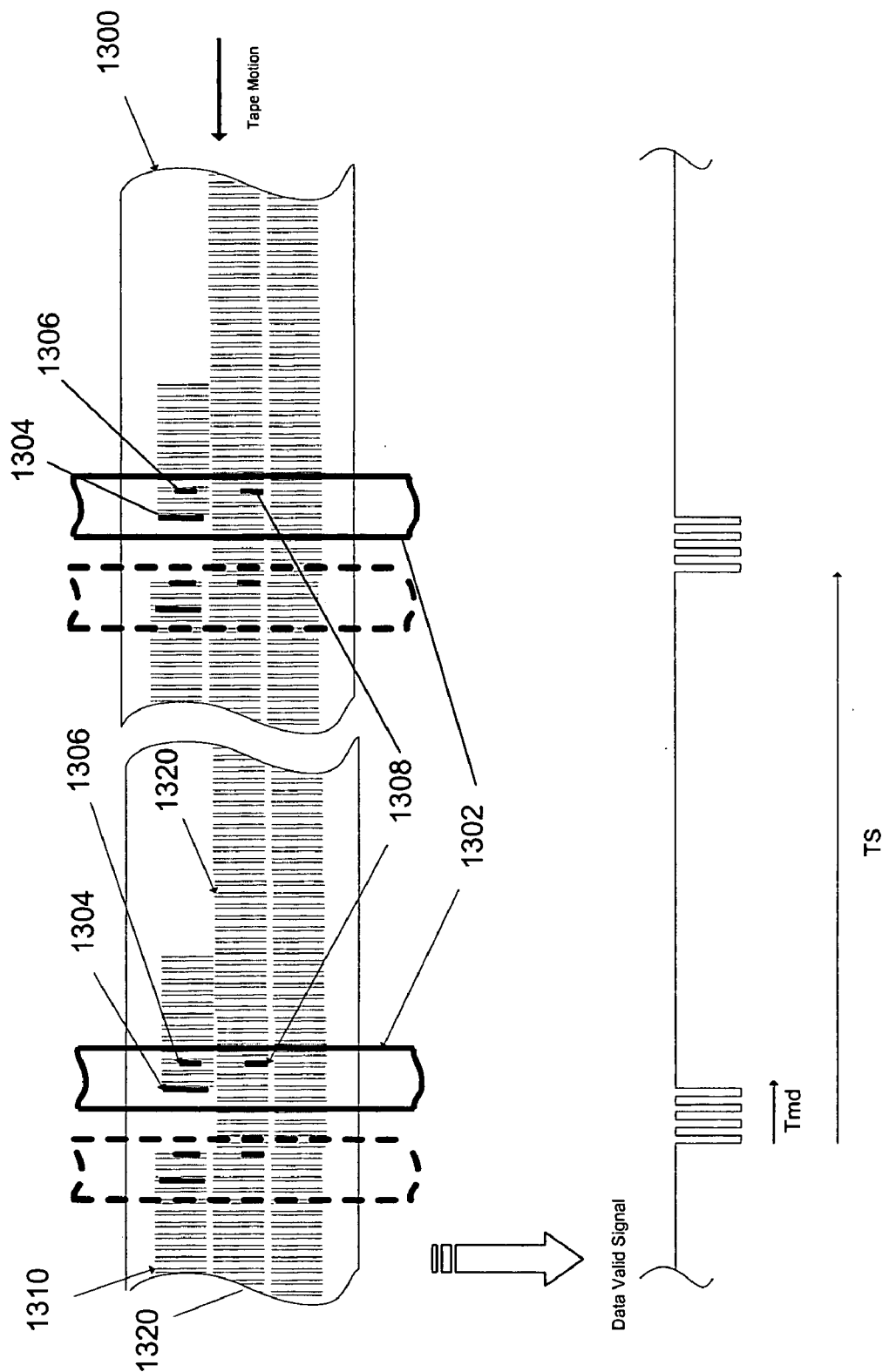
FIG. 13 illustrates an exemplary magnetic head assembly relative to a magnetic storage medium and corresponding read signals during an exemplary servo process.

With reference to FIG. 13, an exemplary method for determining relative position information during a write process is described. FIG. 13 illustrates only the relative position of head 1302 and tape 1300, however, those of ordinary skill in the art will recognize that a servo system and tape drive include numerous other features such as actuators, tape guides, rollers, reels, and the like. Such additional features have been omitted for clarity of the exemplary servo methods and systems.

In one example, a drive servo system reads a previously written reference data track 1320 to obtain relative positional information to adjust the position of head 1302 over active track 1310 (i.e., the track being accessed for either writing or reading data). In one example, the system uses data integrity read signals such as Read Channel Data Validity Resources of the tape drive and signal quality metrics of servo read element 1308 positioned over reference track 1320. A read signal quality metric may be monitored as head 1302, including servo read head 1308, pass over reference track 1320. For a given read/write head geometry, if the relative layout of the central position and/or edges of reference track 1320 with respect to the location of active track 1310 are determined, the drive servo system can use this information to adjust the position of head 1302 over track 1310.

The Read Channel Data Validity Resources ("RCDVR") may provide a relay type signal (ON/OFF), referred to as a "Data Valid" signal (FIG. 13 "Data Valid Signal"), representative of the ability of the read element 1306 to recover data based on any, or combination of any, of the following data validity indicators and signals:
1. Data amplitude valid
2. Data frequency/Phase valid (phase lock loop valid)
3. Data Block's Pre-amble/Post-amble amplitude and or phase/frequency and or sync signal valid
4. Data pattern Valid
5. Data Block's Pre-amble/Post-amble pattern valid.

The lower portion of FIG. 13 illustrates an exemplary read signal received from transducer head 1302 that may determine the relative position of head 402 during operation. As servo read element 1308 read reference track 420, the data valid signal changes its state from "OFF" near the edge of reference track 420 where data is not valid to "ON" where data is valid. To check the track layout dimensions and to position write element 1304 and read element 1306 over reference track 1320, the servo system may halt the read/write function over the active track 1310 at specified time period (Track Layout Check period: Ts as shown in FIG. 13) and initiate a seek to and over the edges of reference track 1320. By monitoring the state of the data valid signal and instantaneous relative position of head 1302 with respect to the active track 1310 location provided by the servo position-sensing device, the servo system registers the location and boundaries of reference track 1320 relative to active track 1310. The registered values, referred to as "Reference Position," are compared to nominal position values. If there are no substantial differences then the track layout is correct and the servo system may initiate a seek back to active track 1310 to resume read/write functions with no further action until the next Track Layout Check time Ts. If there is a difference between the measured reference position and the nominal value, indicating a change in track layout or change in relative position of tape 1300 and head 1302, then the servo system initiates a seek back to active track 1310 and modifies the reference position of the servo positioning loop to correct the track layout back to the nominal dimensions. The system then resumes read/write functions until the next Track Layout Check time Ts.

Since data is not retrieved from or written to active track 1310 during a data track layout check in this example, periodic gaps without data are created within the data pattern of track 1310. The length and duration of the gaps are determined by the duration of the systems ability to determine the reference track location and the time to accurately resolve the Data Valid information from the reference track. The frequency rate of these gaps (Fs=1/Ts) determines correction bandwidth capability of this method and also the overhead to tape capacity. Generally, a higher frequency rate of track layout checks allows for faster correction, but reduces data capacity of the storage medium.

According to another exemplary method, a dedicated read element provides a continuous read signal associated with the relative position of a reference data track with the location of the active track. The servo system may adjust the position of the head to a desired relative position with the reference data track based on the read signal.

Figure 14:
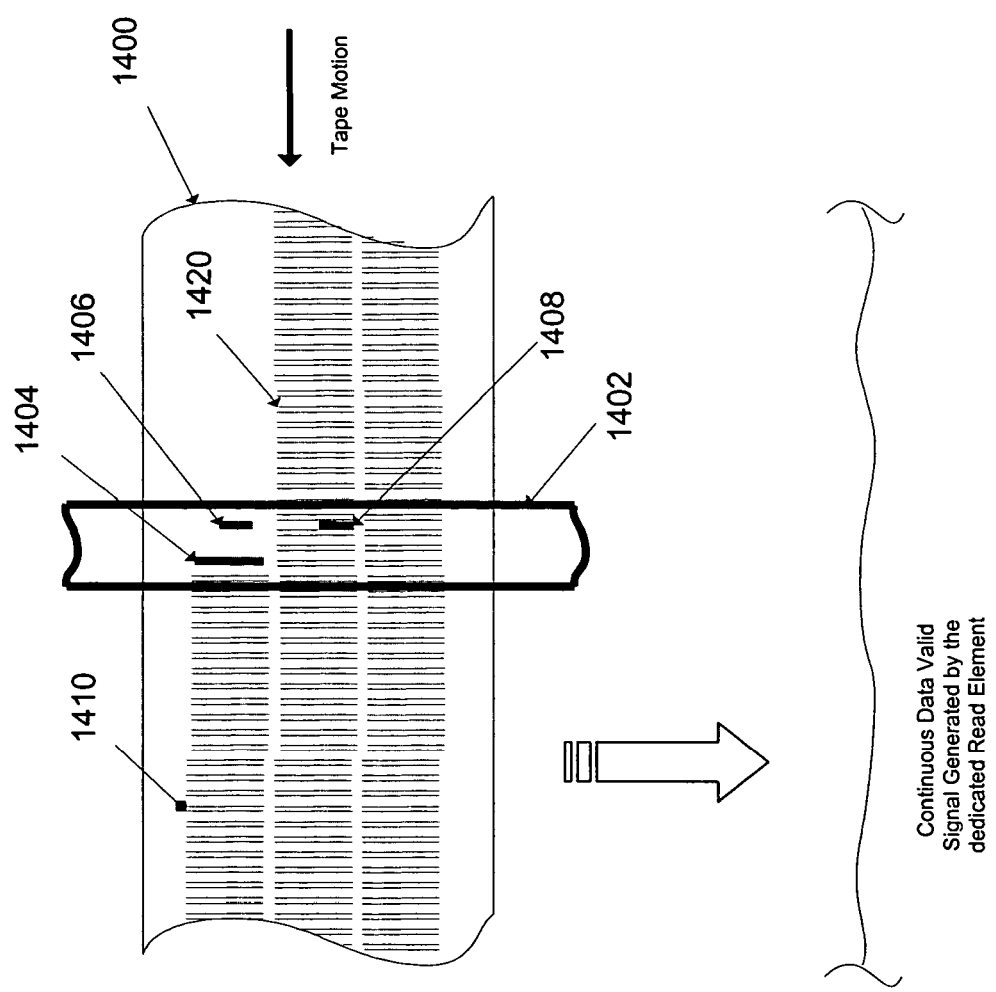
FIG. 14 illustrates an exemplary magnetic head assembly relative to a magnetic storage medium and corresponding read signals during an exemplary servo process.

In particular, FIG. 14 illustrates an exemplary system having a dedicated read element 1408 configured to provide a continuous read signal to the servo system. The operation of the system of FIG. 14 is similar to the system of FIG. 13 except that dedicated servo read element 1408 provides a continuous signal associated with the position of servo read element 1408 relative to reference track 1420. Accordingly, in this example, the servo system may make continuous position determinations and continuous adjustments to the position of head 1402. For example, as read element 1408 moves across the edge of reference track 1420, a read signal (or data valid signal) provides a linear signal proportional to the relative position of servo read element 1408 to the edge of reference track 1420. The read signal is used as a feed back positioning signal to enforce the tracking of the edge of reference track 1420 by the servo read element 1408. The design of head 1402 is such that, when servo read element 1408 tracks the edge of reference track 1420 the active read element 1406 and write element 1404 are positioned over active track 1410. Accordingly, the exemplary method supplies the servo system with a servo read signal for positioning head 1402 over desired track positions, laid out alongside and parallel to a previously written or reference track.

Exemplary transducer heads that may be used with one or more of the above described methods and systems are now described. One exemplary head design includes a center tapped head having two read elements, where at least one read element is a dedicated servo read element to derive servo positioning information from a reference data track.

Figure 15:
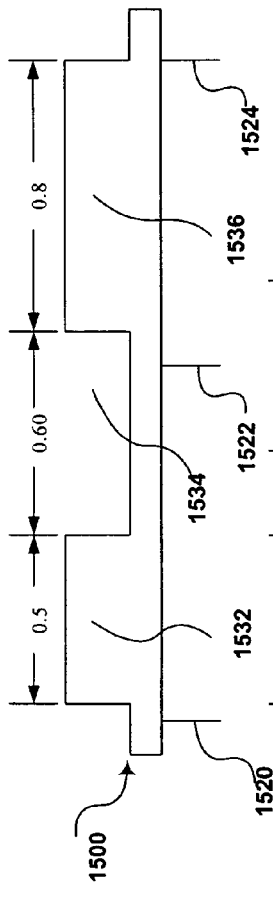
FIGS. 15–19 illustrate exemplary magnetic head geometries.

FIG. 15 illustrates an exemplary center tapped head 1500 with two effective read elements 1532 and 1536. In operation, read element 1532 is configured to be positioned on the center of an active track and is approximately 0.50 track widths. Read element 1536 is approximately 0.8 track widths and separated 0.60 track widths away from read element 1532 by recess 1534. Read element 1536 is configured to be positioned on the reference track center. The dimensions of the second read element 1536, in this example 0.8 track widths, are at the limits of track qualifiers, which may provide for fine track positioning. The portion of head 1500 including read elements 1532 and 1536 includes one magneto-resistive strip. The electrical connections of head 700 are such that the data read element lead 1520 and the servo read element lead 1524, are independent from common lead 1522.

Figure 16:
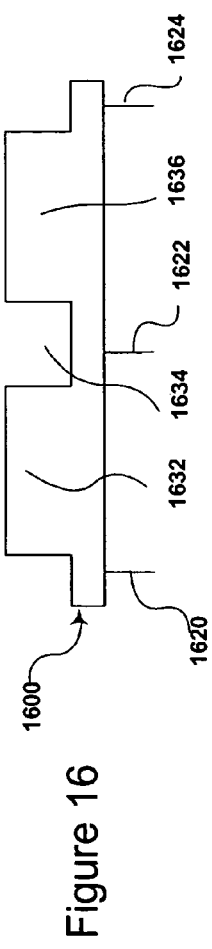

FIG. 16 illustrates an exemplary head 1600. In this example, head 1600 is center tapped with two read elements 1632 and 1636, where read element 1632 is 0.5 track widths and positioned at the center of the active track, and read element 1636 is also 0.5 track widths and separated 0.25 track widths away from read element 1632 by recess 1634. In this configuration, read element 1636 is aligned with an adjacent reference track edge and may sense track qualifiers or the like for positioning information.

Figure 17:
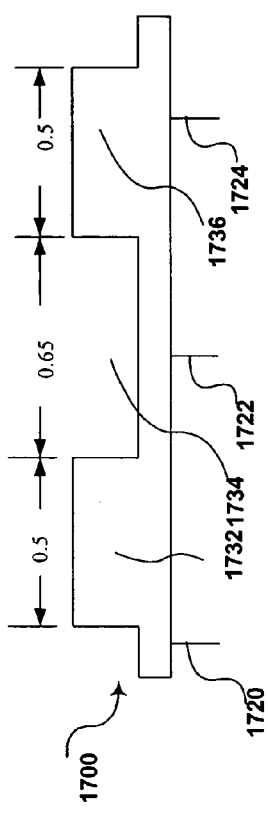

FIG. 17 illustrates an exemplary head 1700. In this example, head 1700 is center tapped with two read elements 1732 and 1736. The configuration of head 1700 is similar to FIG. 16, except that recess 1734 is 0.65 track widths such that read element 1736 is configured to be aligned with the opposite or far edge of an adjacent reference track.

Figure 18:
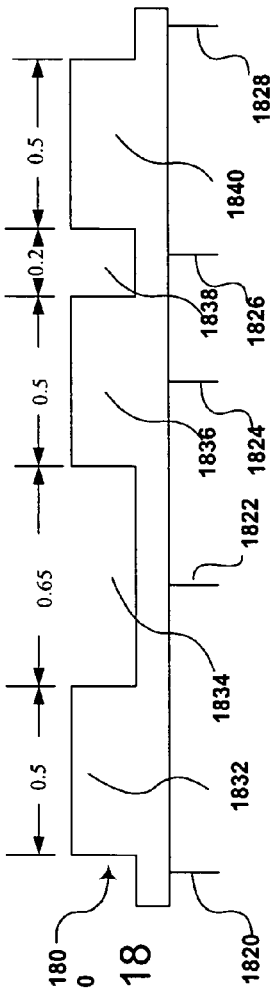

FIG. 18 illustrates an exemplary head 1800 with multiple taps and multiple read elements. Head 1800 includes three read elements 1832, 1836, and 1840 separated by recesses 1834 and 1838. The first read element 32 is configured to read the active track and is positioned nominally at track center. The second read element 1836 is positioned near a reference track edge, e.g., on the edge of track n-1 near edge n-2. The third read element 1840 is positioned on a second reference track, e.g., on the edge of track n-2 near n-1. Head 1800 may be used is a push-pull configuration with two read elements sensing servo qualifiers from the track edge at the n-1 and n-2 boundary. Head 1800 further includes common lead 1826 and read element lead 1828 to support read element 1840.

Figure 19:
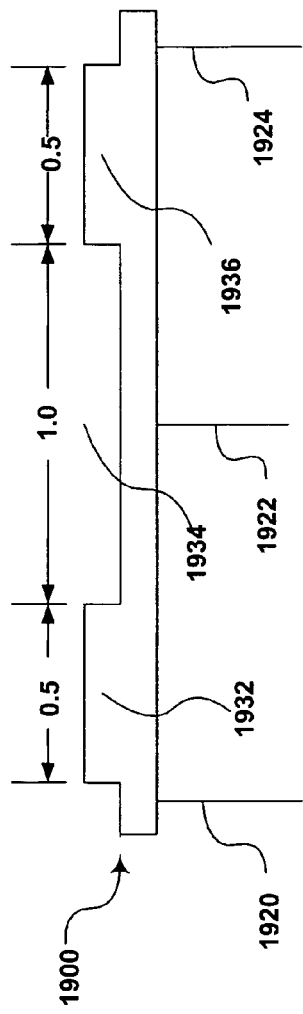

FIG. 19 illustrates an exemplary head 1900. Head 1900 includes read element 1932, which is 0.5 track widths and positioned 1.5 track widths away from the center of servo read element 1936. The separation formed by recess 1934 between read element 1932 and read element 1936 is 1.0 track width such that read element 1936 straddles two adjacent data tracks and may detect phase gaps between data blocks to provide relative position information.

Figure 20:
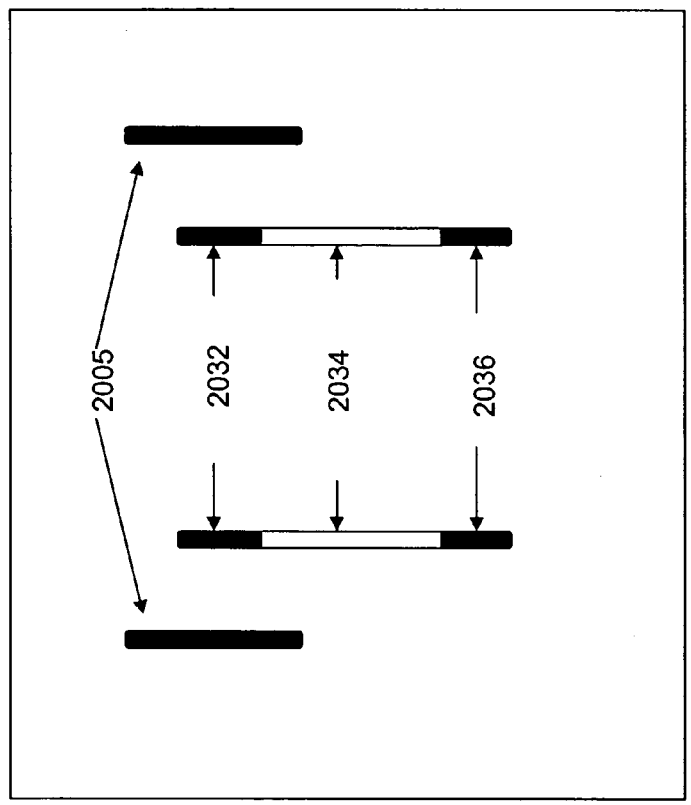
FIG. 20 illustrates one channel of an exemplary read-write multi-channel head.

FIG. 20 illustrates the relative geometry of a typical read-write multi-channel head using the center tapped data and servo read element. In particular, write elements 2005 are shown in relation to data read elements 2032 and servo read elements 2036 for one channel.

It should be recognized by those of ordinary skill in the art that the exemplary heads and servo read element configurations are illustrative only. Various other configurations to read one or more reference tracks and provide servo information to a servo system are possible.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

What is claimed is:

1. A method for recording data tracks on a magnetic storage medium, comprising:
    recording a first data track on a storage medium;
    recording a second data track on the storage medium, the second data track partially overlapping the first data track;
    generating a read signal from a backward read element associated with a multichannel transducer head, the read signal associated with the first data track stored on the magnetic storage medium; and
    determining the relative position of the second data track relative to the first data track from the read signal.

2. The method of claim 1, wherein the backward read element is aligned with a center of the first data track.

3. The method of claim 1, wherein the backward read element is aligned with an edge of the first data track.

4. The method of claim 1, further comprising generating multiple read signals from multiple read elements, wherein the read elements include backward read elements of the multichannel transducer head.

5. The method of claim 4, wherein at least two of the multiple read elements are configured to be relatively offset with at least two different data tracks.

6. The method of claim 1, further comprising repositioning the transducer head relative to the magnetic storage medium based on the read signal.

7. The method of claim 1, wherein a characteristic of the read signal varies as a function of offset between the first data track and the read element.

8. The method of claim 7, wherein the characteristic includes at least one of error signal values, noise signals, average amplitude, average energy, k-bit values, and error rate values.

9. The method of claim 1, wherein the read signal includes a signal quality parametric that varies as a function of offset between the read element and the first data track.

10. The method of claim 1, wherein the width of the first data track and the second data track vary from each other.

11. A head positioning servo system, comprising:
    a transducer head having a forward read element, a forward write element, and a backward read element; and
    a controller for adjusting the position of the transducer head relative to a magnetic storage medium during a writing operation in response to a read signal generated from a reference data track stored on the magnetic storage medium.

12. The system of claim 11, wherein the backward read element is aligned with a center of the reference data track.

13. The system of claim 11, wherein the backward read element is aligned with an edge of the reference data track.

14. The system of claim 11, wherein the data transducer further includes a multi-channel head having multiple backward read elements.

15. The system of claim 14, wherein at least two of the multiple backward read elements are configured to be relatively offset with at least two different data tracks.

16. The system of claim 11, wherein a characteristic of the read signal varies as a function of offset between the reference track and the read element.

17. The system of claim 12, wherein the characteristic includes at least one of error signal values, noise signals, average amplitude, average energy, k-bit values, and error rate values.

18. The system of claim 11, wherein the read signal includes a signal quality parametric that varies as a function of offset between the read element and the reference data track.

19. The system of claim 11, wherein the write element and the backward read element are separated by a distance, the distance configured such that alignment of the read element with at least a portion of a reference track results in the write element being positioned adjacent and partially overwriting the reference track.

20. A method for recording multiple data tracks in a variable width track format, comprising
recording a plurality of adjacent data tracks along a magnetic storage tape, wherein each successively recorded data track partially overlaps a previously written data track, the width of at least two data tracks varies, and each successively recorded data track is recorded to the magnetic storage tape based on position information obtained from a signal from a backward read element of a multichannel transducer head in response to a previously written data track.

21. A method for recording data tracks on a magnetic storage medium, comprising:
recording a first data track on a storage medium;
recording a second data track on the storage medium, the second data track partially overlapping the first data track;
generating a read signal from a read element associated with a transducer head, the read signal associated with the first data track stored on the magnetic storage medium, wherein a characteristic of the read signal varies as a function of offset between the first data track and the read element, the characteristic comprising error rate values; and
determining the relative position of the second data track relative to the first data track from the read signal.

22. The method of claim 21, wherein the characteristic includes at least one of the following: error signal values noise signals, average amplitude, average energy, and k-bit values.

23. The method of claim 21, wherein the read element includes a backward read element of a multichannel transducer head.

24. The method of claim 21, wherein the characteristic further comprises error signal values.

25. The method of claim 21, wherein the characteristic further comprises noise signals.

26. The method of claim 21, wherein the characteristic further comprises average amplitude.

27. The method of claim 21, wherein the characteristic further comprises k-bit values.

* * * * *